United States Patent [19]
Hillier

[11] Patent Number: 4,671,169
[45] Date of Patent: Jun. 9, 1987

[54] FLUID ACTUATED RAM ASSEMBLY

[75] Inventor: Raymond G. Hillier, Runaway Bay, Australia

[73] Assignee: Delibes Pty. Ltd, Queensland, Australia

[21] Appl. No.: 647,800

[22] Filed: Sep. 6, 1984

[30] Foreign Application Priority Data

Sep. 6, 1983 [AU] Australia .............................. PG1254

[51] Int. Cl.[4] ........................ F01B 29/04; F16J 15/18; F16J 10/00

[52] U.S. Cl. ........................................ 92/59; 92/85 B; 92/128; 92/164; 92/168; 92/171

[58] Field of Search ........................... 91/394, 395, 25; 92/85 B, 13.6, 59, 128, 154, 162.1, 165 R, 258, DIG. 1, 171, 164–168; 29/156.5 R; 285/332.2, 332.3, 354

[56] References Cited

U.S. PATENT DOCUMENTS

| | | | |
|---|---|---|---|
| Re. 24,532 | 9/1958 | Halladay et al. | 91/394 |
| 1,761,600 | 6/1930 | Tymstra | 92/164 X |
| 2,104,799 | 1/1938 | Evans | 285/332.2 X |
| 2,443,312 | 6/1948 | Geiger et al. | 91/394 |
| 2,480,633 | 8/1949 | Christensen | 92/164 |
| 2,483,845 | 10/1949 | Robertson | 92/171 X |
| 2,730,960 | 1/1956 | Krause | 92/171 |
| 2,826,467 | 3/1958 | Ballard | 92/164 |
| 3,141,386 | 7/1964 | Loughridge | 92/13.6 |
| 3,162,092 | 12/1964 | Corwin | 92/164 |
| 3,195,422 | 7/1965 | Corwin | 92/164 |
| 3,559,540 | 2/1971 | Sheldon | 92/168 X |
| 3,750,537 | 8/1973 | Goade et al. | 92/165.1 |
| 3,955,479 | 5/1976 | McLuckie | 92/171 X |

*Primary Examiner*—Robert E. Garrett
*Assistant Examiner*—Mark A. Williamson
*Attorney, Agent, or Firm*—Larson and Taylor

[57] ABSTRACT

A fluid actuated ram assembly includes a cylindrical barrel and a rear end cap attached to a rear end of the cylindrical barrel. A piston is located within the cylindrical barrel and both the piston and the cylindrical barrel are adapted for relative movement with respect to each other. There is also provided a piston rod having a piston attached to one end portion thereof. There is also provided a bearing member or guide bush located adjacent to the piston which has a central aperture for the piston rod and also one or more longitudinal passages communicating with the piston. There is also provided a front end cap releasably attached to the cylindrical barrel which has a fluid port communicating with the one or more longitudinal passages of the bearing member or guide bush.

14 Claims, 10 Drawing Figures

FLUID ACTUATED RAM ASSEMBLY

This invention relates to a fluid actuated ram assembly.

Conventional fluid actuated ram assemblies include a piston, a piston rod attached to the piston, a cylinder or housing for the piston and opposed end caps attached to the cylinder. Usually one end cap or front end cap is removably or screw threadedly engageable with an adjacent end of the cylinder to facilitate removal of the piston and piston rod assembly for maintenance purposes in relation to replacement of seals for example. Normally the other end cap or rear end cap is welded to the cylinder. Usually there was provided a rear port welded or otherwise attached to the cylinder body adjacent the rear end cap and a front port welded or otherwise attached to the cylinder adjacent the front end cap. There was also included an O-ring or sealing member located within the internal bore of the cylinder which was normally located in a groove provided in an external surface of the bearing or guide bush for the piston rod.

In conventional fluid actuated ram assemblies problems which frequently occurred were the corrosion of the above-mentioned O-ring located in the piston rod guide bush as well as the problem of leakage occurring past this O-ring when the cylinder may momentarily bulge in the middle due to a "high transient shock" where pressures of 8000–10000 psi could be encountered.

Another problem with conventional fluid actuated ram assemblies was that they often provided only reduced "lift-off" areas or pressure areas between the piston and the piston rod support bush and/or the rear end cap.

It was also the case that since both the rear port and front port were fixed that it was usually not possible to align the location of one port relative to the other.

Another problem with conventional fluid actuated ram assemblies was that often during dismantling of the front end cap for maintenance purposes in relation to replacement of seals and the like the location of the abovementioned O-ring was disadvantageous in that often it was contacted by an exposed thread surface thereby damaging the O-ring.

An object of the invention is therefore to provide a fluid actuated ram assembly which may alleviate one or more of the abovementioned disadvantages associated with the prior art.

The invention therefore provides a fluid actuated ram assembly including:

a cylindrical barrel;

a rear end cap attached to a rear end of the cylindrical barrel;

a piston located within said cylindrical barrel and wherein said piston and said cylindrical barrel are adapted for relative movement with respect to each other;

a piston rod having the piston attached at one end portion thereof;

a bearing member or guide bush located adjacent to the piston and having a central aperture for the piston rod and also having one or more longitudinal passages communicating with said piston; and a front end cap releasably attached to the cylindrical barrel and having a fluid port communicating with said one or more longitudinal passages of the bearing member or guide bush.

The cylindrical barrel may be movable relative to the piston but more preferably the piston is movable relative to the cylinder. The ram assembly of the invention may be pneumatically actuated but is more suitably hydraulically actuated.

Preferably a fluid actuated ram assembly of the invention is double acting and therefore may include a front port as well as a rear port. However it will also be appreciated that a ram assembly constructed in accordance with the invention may be single acting and thus the piston rod assembly may include a spring biassed return stroke.

In one embodiment of the invention the rear end cap is suitably welded or otherwise rigidly attached to an adjacent end of the cylinder. It is possible for the rear end cap to be screw threadedly attached to the cylinder but the rigid or integral attachment is preferable.

Suitably the end cap is plate like having a pair of opposed end surfaces and a continuous side surface or side wall. A rear port is suitably provided which extends through the side wall into a central chamber in the rear end cap which is located adjacent to a piston assembly when the ram assembly is in the retracted position.

Preferably the rear end cap includes an outwardly extending peripheral rib located on an inner end surface thereof which may engage in a mating groove located on the piston when the ram assembly is in the retracted position. Suitably the rib may have located on its top or outer surface a continuous groove accessible to fluid or oil from the central chamber. Preferably a continuous groove is helical or in the form of a continuous spiral.

The piston which engages the internal surface of the cylinder suitably includes within its peripheral surface one or more seals and wear rings as is known in the art.

The piston rod suitably has a front portion of constant cross section, an intermediate tapered portion and a rear threaded section which engages within a mating screw threaded socket or passage in the piston. The piston also includes in this particular embodiment a tapered bore which mates with the tapered intermediate portion of the piston rod. Suitably in this embodiment bonding agent is used to attach the piston rod to the piston in the threaded area so as to make the piston rod and piston in effect an integral assembly.

The cylindrical barrel also includes a front end cap releasably or screw threadedly attached to the front end of the cylinder. The front end cap includes an outer end portion and a continuous side surface or wall surrounding a central aperture. The front port may extend through the side wall of the front end cap.

Preferably the outer end portion of the front end cap will include one or more sealing members in an internal surface surrounding the central aperture. The front end cap suitably also includes a tapered outer end surface surrounding a planar outer end surface which surrounds the aperture.

The front end cap may also include an inner end portion including on an internal surface thereof a threaded part for engaging with a mating threaded part on the front end of the cylinder.

Suitably there is provided on the inner end portion of the front end cap a continuous groove for accommodating an O-ring or peripheral seal which is located inwardly of said threaded portion.

There also may be provided an adjustment shim or spacer suitably in the form of a ring member or collar having a gap or slot to facilitate attachment to the cylinder which in use allows the position of the front port to be varied radially relative to the rear port.

The guide bush may also include a peripheral outwardly extending rib on an inner surface thereof which may engage with a mating groove located on an adjacent end surface of the piston when the piston is in the extended position. Suitably the top or outer surface of the rib may include a continuous groove suitably in the form of a spiral or helix or previously described for the rear end cap which is accessible to fluid from the front port.

Reference may now be made to a preferred embodiment of the invention as shown in the accompanying drawings wherein.

Figure 1:
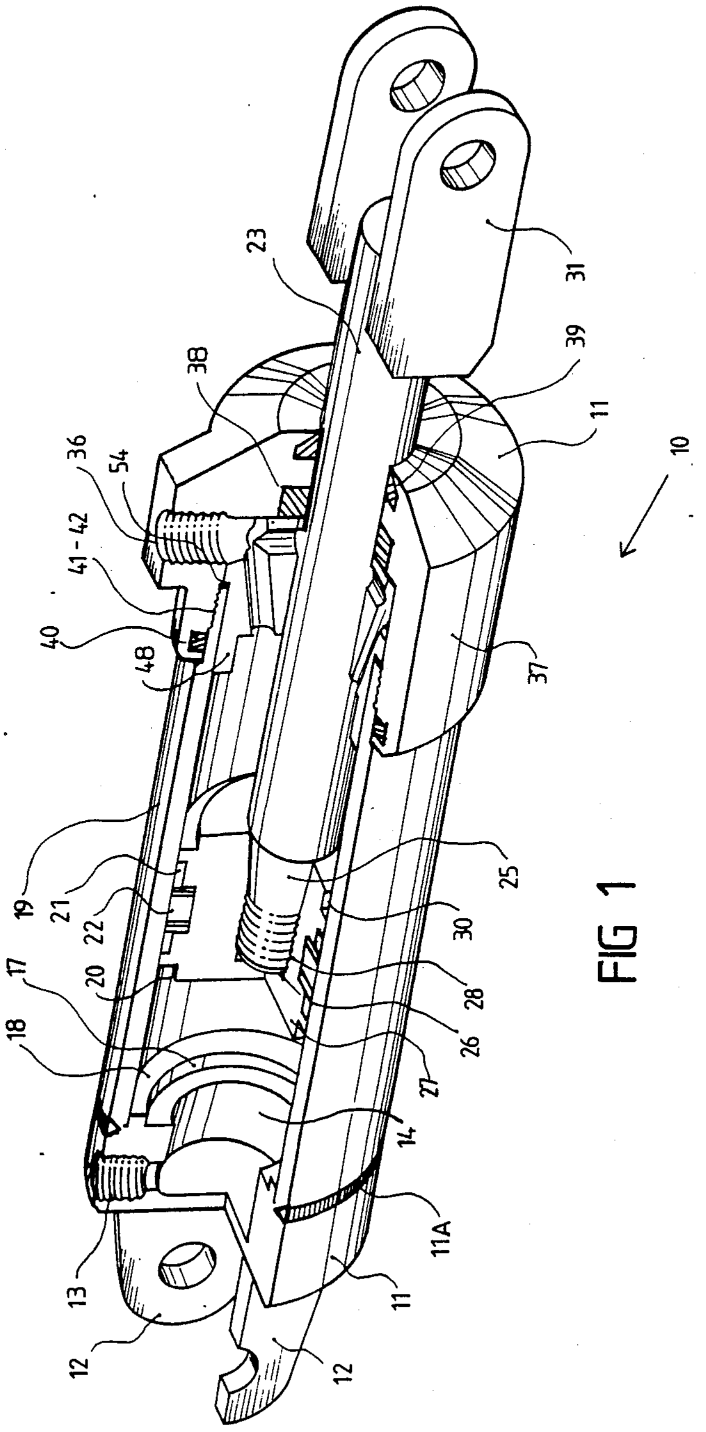
FIG. 1 is a perspective view of a fluid actuated ram assembly constructed in accordance with the invention partly broken away.

In the drawings in FIGS. 1–5 there is shown hydraulic ram assembly 10 comprising rear end cap 11 having opposed clevis plates 12 attached thereto. End cap 11 is welded to cylindrical barrel 19 at 11A. End cap 11 also includes rear port 13 and central cavity or chamber 14 connected to port 13 by passage 15. Port 13 is adapted to be closed by dust cap 16. End cap 11 also has peripheral rib 17 as shown having a grooved outer surface 18.

There is also shown gap 19A between end cap 11 and piston 27.

There is also shown piston rod 23 having a front portion 24 of constant cross section, an intermediate tapered portion 25 and rear end portion 26 which is screw threaded.

There is also shown piston 27 having wear rings 21 and "J" seal and back up ring assembly 22. Piston 27 also has peripheral groove 20 for engaging with rib 17 as shown. Piston 27 also has threaded socket 28 bonded to portion 26 of piston rod 23, tapered portion 29 for engaging with tapered portion 25 of piston rod 23, and peripheral groove 30.

Figure 5:
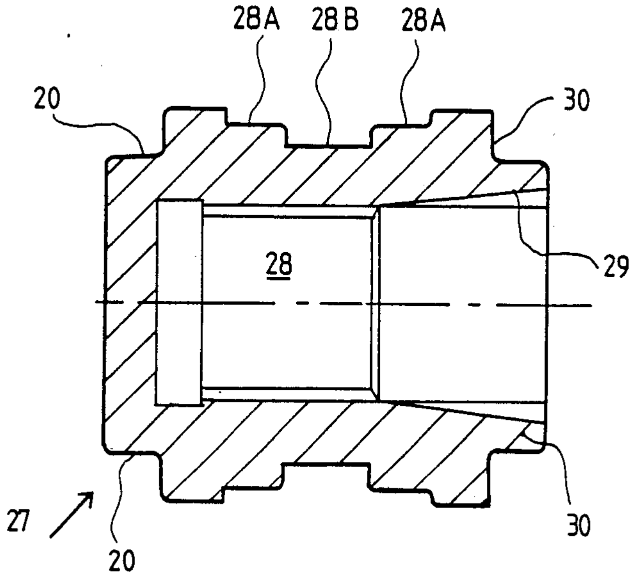
FIG. 5 is a sectional view of the piston.

Piston rod 23 as shown is attached to a pair of opposed clevis plates 31. It includes as best shown in FIG. 5 grooves 28A for the wear rings and central groove 28B for the J seal previously described. There is also shown front end cap 32 having tapered end surface 33, planar end surface 34, central aperture 35 for receiving piston rod 23, front port 36, and inner end portion 37. There is also shown piston rod seal 38, piston rod wiper 39, and front end cap seal 40. Also shown is threaded part 41 engaging with mating screw threaded part 42 of cylindrical barrel 19 at an attachment zone and thus constituting releasable engagement means. Also shown is groove 38A for seal 40.

There is also shown piston rod guide bush 44 having angled longitudinal passageways 45 leading from front port 36 to gap 46 between inner end surface 47 of bush 44 and piston 27. Bush 44 also has a peripheral rib 48 having a continuous spiral groove 49 located in an end surface of rib 48. Rib 48 engages with groove 30 of piston 27.

Guide bush 44 also includes inlet port 50 which communicates with longitudinal passageways 45 as well as intermediate passageways 51 and 52 leading to central annular reservoir 53. There is also shown central aperture 53A for insertion of piston rod 23.

There is also shown adjustment shim 54 for longitudinally adjusting the position of port 36 relative to port 13.

Figure 6:
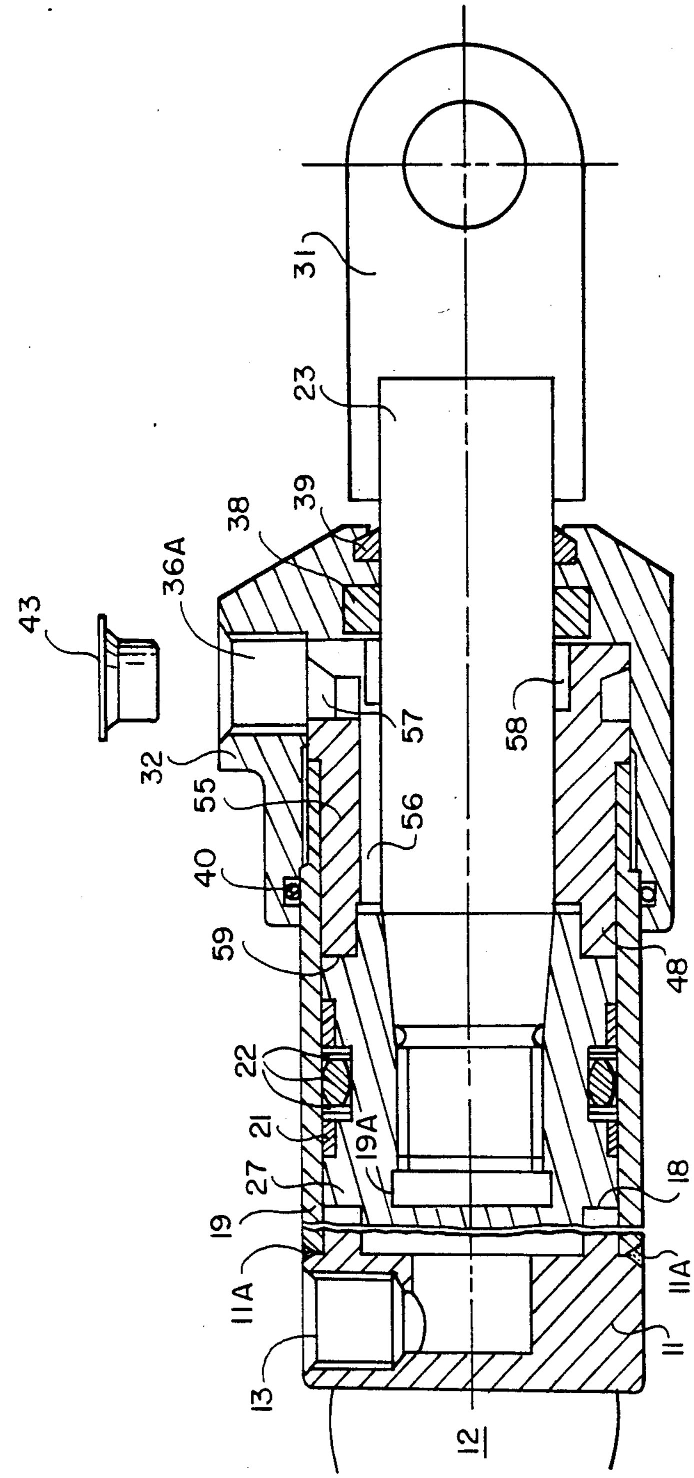
FIG. 6 is a sectional view similar to FIG. 2 of a modified ram assembly constructed in accordance with the invention.
Figure 7:
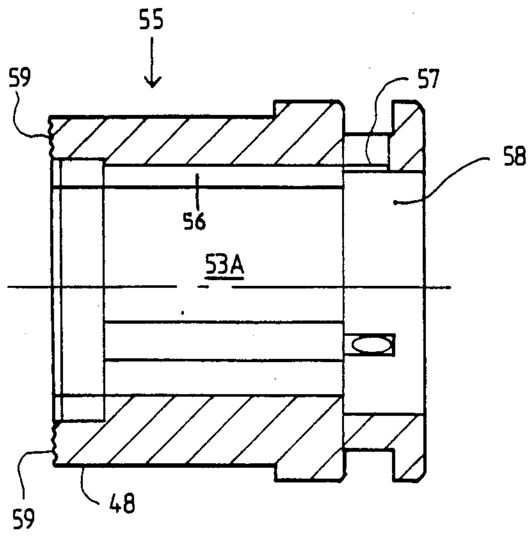
FIG. 7 is a sectional view of a piston rod guide bush for use in the ram assembly of FIG. 6.

In FIG. 6 there is shown a modified ram assembly wherein similar features as described above in relation to the ram assembly of FIGS. 1–5 are identified by the same reference numerals. The main difference is that there is utilized a modified guide bush 55 having a plurality of longitudinal passages 56 leading from port 36A instead of angled passageways 45 described previously. There is also shown intermediate passages 57 and annular central reservoir 58. Guide bush 55 also has spirally grooved surface 59 similar to spirally grooved surface 49 described previously which is shown particularly in FIG. 7. Also shown is dust cap 43.

Figure 2:
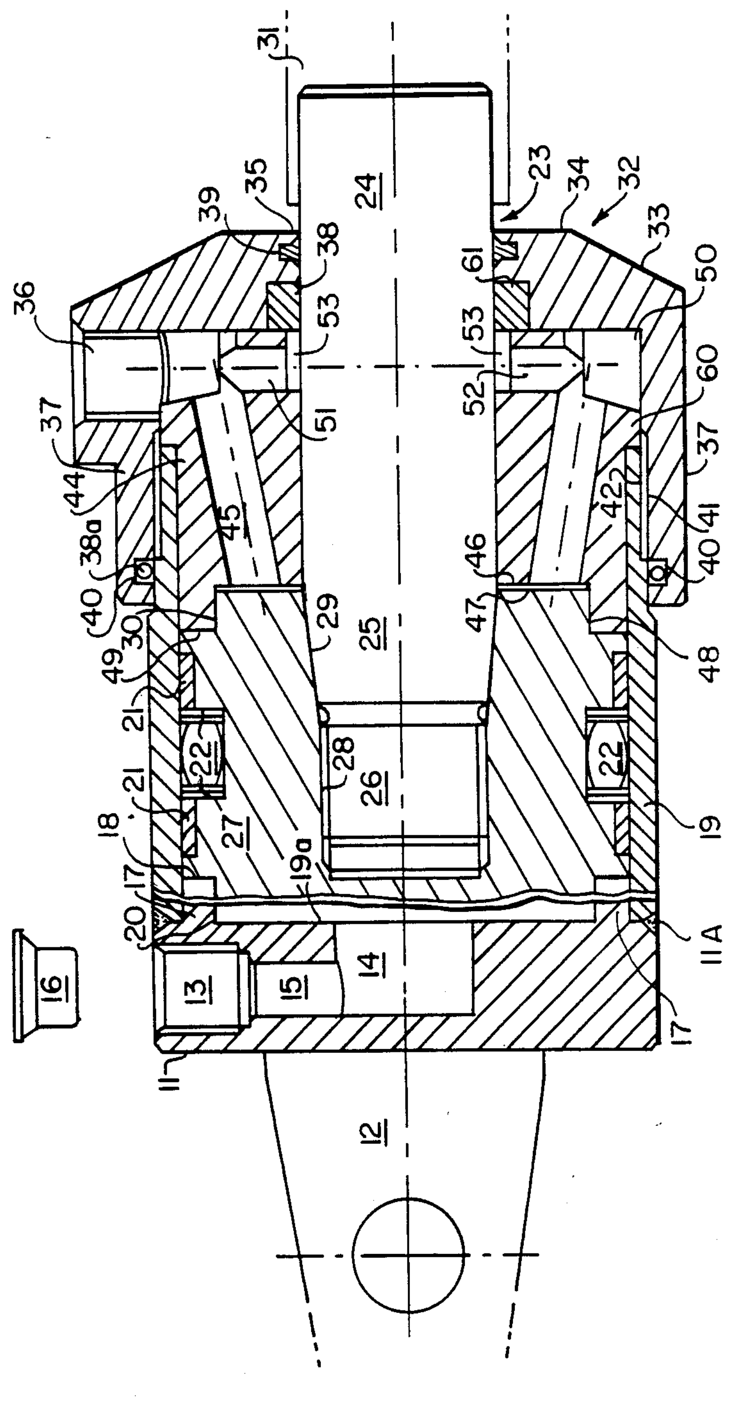
FIG. 2 is a sectional view of the assembly of FIG. 1 through a horizontal plane.
Figure 3:
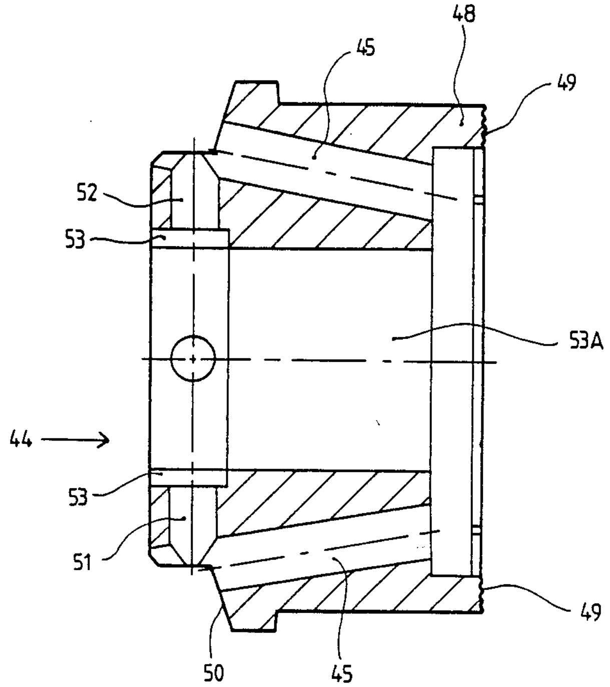
FIG. 3 is a sectional view of the piston rod guide bush.
Figure 4:
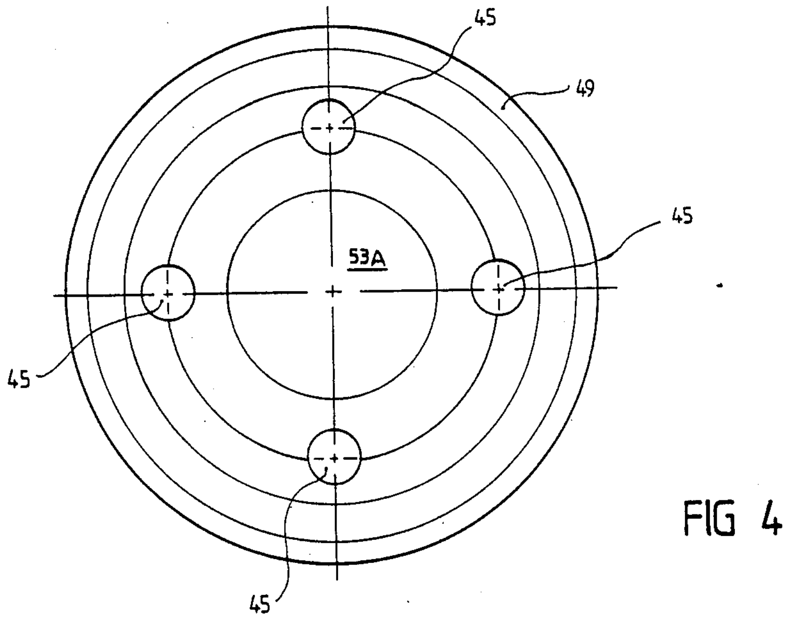
FIG. 4 is an end view of the guide bush shown in FIG. 3.
Figure 10:
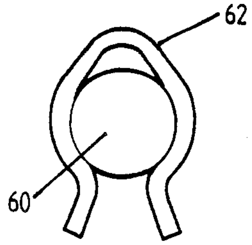
FIG. 10 is a view of a clevis pin clip for use with the clevis pin of FIG. 9.
Figure 9:
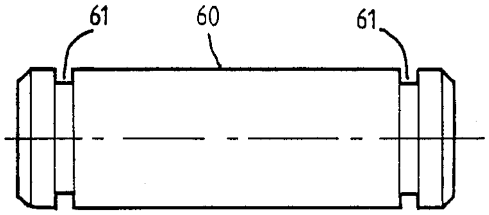
FIG. 9 is a view of a clevis pin for use with the ram assembly of FIG. 2 or FIG. 6.
Figure 8:
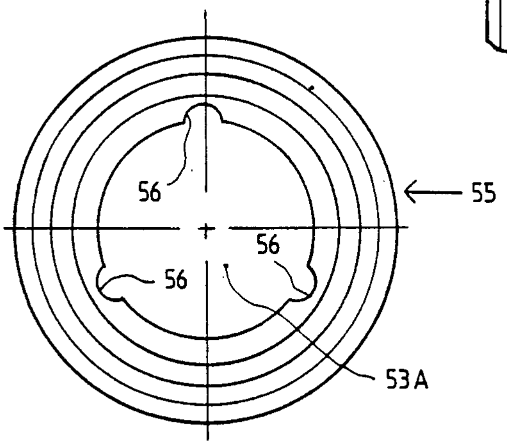
FIG. 8 is an end view of the guide bush of FIG. 7.

In FIGS. 9–10 there is shown clevis pin 60A having end grooves 61 for retention thereby by clip 62 for attachment of clevis plates 12 and 31 to a stationary part of a machine (not shown) and a movable part of the machine (not shown). As best shown in FIG. 2 rod bush 44 also has outstanding shoulder 60 which abuts against the internal surface of front end cap 32.

The provision of tapered surface or portion 25 of piston rod 23 is useful in that it enables for ready insertion and alignment of rod 23 within piston 27 without the possibility of damaging any seals as was the case previously. This enables an exta seal between the piston rod 23 and piston 27 to be eliminated and ensures that the integral assembly of piston rod 23 and piston 27 is concentric so that resultant forces are transferred without any deflecton. The rod thread is of particularly large diameter to inhibit thread stretch and consequent piston failure.

The provision of tapered end surface 33 of front end cap 32 eliminates the possibility of trapped corrosives and water occurring in the ram assembly which in turn inhibits breakdown of the piston rod surface and destruction of seals. It also allows for obstacles to fall clear from becoming lodged between the front end of cylinder 19 and end cap 32 particularly when the assembly 10 is mounted in a vertical orientation.

The provision of rib 17 and mating groove 20 at the rear end of the assembly 10 and rib 48 and mating groove 30 ensures that "cushions" are provided for the pistion when in the retracted or the extended position and thus the oil flow and hence piston speed may be retracted prior to full extension and retraction of the piston rod 23.

The provision of continuously grooved surfaces 18 and 49 ensure that the full piston area is available for fluid pressure from a fully extended or retracted rod 23. This provides maximum "lift off" areas compared to conventional hydraulic ram assemblies. Thus the fluid or oil from the front port 36 or rear port 13 will run around in the spiral groove to increase the effective pressure to be imparted to the piston.

The provision of shim 54 enables the radial position of port 36 to be adjusted relative to port 13. This enables changes to be made during installation to overcome mis-alignment problems. Simple shims 54 cut to fractions of the front cap thread may be inserted between the front cap and cylinder end. No special tools or machining is therefore required.

The placement of seal 40 within the position as shown in the drawings is advantageous in that it is protected from corrosion because it is continually bathed in oil or hydraulic fluid. This enables the front cap 32 to be easily removed providing for convenient maintenance. Cap 32 may be easily removed even after long field use. In conventional hydraulic ram assemblies the thread is provided in the internal bore of cylinder 19 and thus is isolated from oil flow and subject to corrosion making dismantling difficult and in some cases impossible. This particular feature also adds to the reliability of the cylinder 19 by increasing effective sealing when the barrel 19 "bulges" due to high transient shocks as described previously.

The rod bush 44 is suitably formed from high grade SG iron to overcome "grabbing" of the rod 23 in hot conditions. Some conventional ram assemblies use a rod bush formed from aluminium or bronze which expands or "grows" in hot conditions resulting in a grabbed bush and subsequent leaking. The aluminium or bronze bush also offers dissimilar metal corrosion and maintenance problems. The use of SG iron substantially eliminates these problems as it has a very low coefficient of friction and is an excellent bearing material. The bush 44 is also of greater length than conventional rod bushes and this offers greater rod support and thereby reduces side load shocks. SG iron also is unquestionably of higher loading capacity.

The use of passageways 45 and 56 is also unique in that oil may travel along these passageways running the length of bush 44 and terminate directly at the surface in contact with piston 27. The use of these passageways offers minimum pressure drop between port 36 or 36A and piston 27 and increases overall efficiency.

Also both ports 13 and 36 or 36A are located in end caps 11 and 32 respectively and thus are completely divorced from the precision honed cylinder tube 19. Most conventional hydraulic ram assemblies have ports welded to the barrel as described previously and this may result in deformation and surface oxidation of the close tolerance honed diameter of tube 19 and thus leaves carbon and scale deposit on the interior of tube 19. This may be honed after welding. However most suppliers omit this additional finishing cost which is detrimental to life expectancy of the seals. This feature also allows for rapid change in cylinder stroke length by the end user. The cylinder 19 and piston rod 23 are in effect the only non-standard components as all other components are interchangeable when required.

The invention also provides a method of assembly of the ram assembly using the following steps:

(i) fitting of seals 22 and wear rings 21 to piston 27 as well as seal 40 to front end cap 32;

(ii) attachment of piston rod 23 to front end cap 32;

(iii) attachment of guide bush 44 or 55 to piston rod 23 by slideable interengagement;

(iv) attachment of piston rod 23 to piston 27 as described using bonding agent in the threaded areas;

(v) Insertion of piston rod assembly comprising piston rod 23, piston 27, bush 44 or 55 and front end cap 32 within internal bore of cylinder 19 wherein an outer edge of tube 19 is tapered and/or radiused to facilitate such insertion; and (vi) attachment of front end cap 32 to cylinder 19.

The assembled piston rod assembly as described above in step (v) when separate from cylinder 19 forms an assembly which, when inserted into the cylinder 19 aligns the front end cap 32 and the abovementioned seals by use of peripheral rib 48 engaging groove 30. This means that seal 40 clears the thread 41 on the cylinder tube 19 and locates the O-ring 40 on the external surface or outer diameter or tube 19 as thread 42 of cap 32 engages thread 41 on tube 19. As the cap 32 is tightened this pulls the rod bush 44 or 55 tightly on the end of tube 19. This sequence of assembly is brought about by the unique dimensioning and system of manufacture which guarantees systematic assembly and concentricity of components which fully protects the seals. Seal 40 may also be inspected for imperfections in casting and/or machining operations without any special aids.

Rib 48 also is suitably located or dimensioned so that upon assembly of front end cap 32 and guide bush 44 and engagement within cylindrical barrel 19 the clearance of thread 41 by seal 40 as described above is enhanced.

The provision of shoulder 60 for guide bush 44 assists in precise and accurate location of front end cap 32 within cylindrical barrel 19 thus satisfying concentricity dimensional requirements.

Also the provision of piston rod seal 38 within an open ended recess 61 so that it is abutted by both rod bush 44 and front end cap 32 facilitates simplicity of machining operations in construction of ram assembly 10 and also for inspection of surface finish and measurement for size.

The relatively long taper 25 of piston rod 23 also allows the piston rod 23 to be easily and rapidly assembled through rod wiper seal 39 and piston rod seal 38 with maximum guiding alignment while maintaining the absolute safety and preservation of the seals by the long guiding effect of taper 25. This ensures that assembly damage to the seals and rod bush due to sudden projections causing shearing and broaching damage of seals and rod bush as occurs in conventional ram assemblies is substantially eliminated.

It will be clear from the foregoing that the structural feature which is mainly responsible for the above-mentioned advantages achievable by the present invention is the feature of the rod bush having the said longitudinal passage which may communicate with an adjacent surface of the piston and the fluid or front port located in the front end cap. This feature facilitates the location of seal 40 in the front end cap so that it is located in advance of screw threaded portions 41–42.

What is claimed is:

1. A fluid actuated ram assembly including:

a cylindrical barrel;

a rear end cap located at a rear end of the cylindrical barrel;

a piston located within the cylindrical barrel for relative movement with respect thereto;

a piston rod;

a guide bush located adjacent to the piston and having a central aperture for the piston rod and including at least one longitudinal passage communicating with the piston;

a front end cap for the cylindrical barrel separate from the guide bush and located adjacent thereto, and having a fluid port communicating with said at least one longitudinal passage and releasable engagement means between the front end cap and the cylindrical barrel for providing engagement between the front end cap and the barrel at an attachment zone, and for retaining the guide bush in a desired fixed position in abutment with the front end cap and the cylindrical barrel, a sealing ring disposed between the front end cap and the cylindrical barrel rearwardly of said attachment zone, a retaining ring being located in an internal surface of the front end cap for accomodating the sealing ring such that the sealing ring seals externally of the cylindrical barrel and is contact with fluid contained in the cylindrical barrel; and sealing means, comprising a further sealing ring received in a further groove at least partially defined by said front end cap and disposed between the front end cap and the piston rod, for providing sealing between the front end cap and the piston rod.

2. A fluid actuated ram assembly as claimed in claim 1 wherein said releasable engagement means comprises screw threading on said front end cap and said cylindrical barrel by means of which the front end cap is screw threadedly attached to the cylindrical barrel at said attachment zone.

3. A fluid actuated ram assembly as claimed in claim 2 in said assembly further comprises an adjustment spacer associated with the attachment zone for permitting said fluid port in the front end cap to be varied longitudinally relative to a rear port located in the rear end cap.

4. A fluid actuated ram assembly as claimed in claim 1 wherein the guide bush has a peripheral outwardly extending rib which engages with a mating groove located on an adjacent end surface of the piston and which abuts the internal surface of the cylindrical barrel.

5. A fluid actuated ram assembly as claimed in claim 1 wherein the piston rod includes an intermediate tapered portion and said piston also has a mating tapered bore which mates with the intermediate tapered portion of the piston rod.

6. A fluid actuated ram assembly as claimed in claim 1 wherein said guide bush is provided with a shoulder portion which abuts with the internal surface of the cylindrical barrel and also with said front end cap.

7. A fluid actuated ram assembly as claimed in claim 1 wherein the guide bush includes a centrally located fluid reservoir communicating with said longitudinal passages.

8. A fluid actuated ram assembly as claimed in claim 1 wherein said rear end cap is attached to the rear end of the cylindrical barrel.

9. A fluid actuated ram assembly as claimed in claim 1 wherein said rear end cap is integral with the rear end of the cylindrical barrel.

10. A fluid actuated ram assembly as claimed in claim 1 wherein said further groove is defined between the front end cap and the guide bush by portions of the front end cap and the guide bush.

11. A fluid actuated ram assembly as claimed in claim 1 wherein a clevis is attached to one of (i) the rear end cap and (ii) the free end of the piston rod, said clevis including a clevis pin having cylindrical circumferential grooves in opposite ends thereof and a pair of retaining clips received in said grooves, said retaining clips being open at one end and including opposed S-shaped leg portions intermediate curved sections of which engage in said grooves.

12. A fluid actuated ram assembly as claimed in claim 1 wherein said guide bush includes a peripheral rib which engages the inner wall of said cylindrical barrel and the free end of which extends rearwardly of the rear most edge of said front end cap.

13. A method of assembly of a fluid actuated ram assembly comprising a cylindrical barrel; a rear end cap located at a rear end of the cylindrical barrel; a piston located within the cylindrical barrel for relative movement with respect thereto; a piston rod; a guide bush located adjacent to the piston and having a central aperture for the piston rod and including at least one longitudinal passage communicating with the piston; a front end cap for the cylindrical barrel separate from the guide bush and located adjacent thereto, and having a fluid port communicating with said at least one longitudinal passage, and releasable engagement means between the front end cap and the cylindrical barrel to retain the guide bush in a desired fixed position in abutment with the front end cap and the cylindrical barrel, said front end cap including a retaining groove formed in an internal surface thereof rearwardly of the engagement means and a further recessed position therein at least partially defining a further groove; said method including the steps of:

(i) fitting a barrel sealing ring in the retaining groove in the front end cap and a piston sealing ring in said recessed portion of the front end cap;

(ii) attaching the piston rod to the front end cap;

(iii) attaching the guide bush to the piston rod by slidable interengagement;

(iv) attaching the piston rod to the piston;

(v) inserting the assembly rod comprising the piston rod, piston, guide bush and front end cap within an internal bore of the cylindrical barrel; and (vi) attaching the front end cap to the cylindrical barrel using said releasable engagement means.

14. A fluid actuated ram assembly including:

a cylindrical barrel;

a rear end cap located at a rear end of the cylindrical barrel;

a piston located within the cylindrical barrel for relative movement with respect thereto;

a piston rod;

a guide bush located adjacent to the piston having a central aperture for the piston rod and including at least one longitudinal passage communicating with the piston;

a front end cap for the cylindrical barrel separate from the guide bush and located adjacent thereto, and having a fluid port communicating with said at least one longitudinal passage, releasable engagement means between the front end cap and the cylindrical barrel to retain the guide bush in a desired fixed position in abutment with the front end cap and the cylindrical barrel; said front end cap being threadedably attached to the cylindrical barrel at an attachment zone;

a sealing ring disposed between the front end cap and the cylindrical barrel rearwardly of said attachment zone, a retaining groove being located in an internal surface of the front end cap for accomodating the sealing ring such that the sealing ring seals externally of the cylindrical barrel and is in contact with the fluid container in the cylindrical barrel; and sealing means, comprising a further sealing ring disposed between the front end cap and the piston rode and received in a further groove at least partially defined by said front end cap, for providing sealing between the front end cap and the piston rod.

* * * * *